United States Patent Office 3,439,384
Patented Apr. 22, 1969

3,439,384
MOLDING WITH TREAD INSERTS
William P. Crossen, Magnolia, and Walter W. Yarrison, Beverly, Mass., assignors to USM Corporation, Flemington, N.J., a corporation of New Jersey
Filed Aug. 30, 1966, Ser. No. 576,117
Int. Cl. B29d 3/00
U.S. Cl. 18—36                                    4 Claims

ABSTRACT OF THE DISCLOSURE

A mold assembly for the injection molding of a footwear sole having a tread insert, the assembly including a bottom mold member having means upstanding from its mold cavity surface for engaging peripheral portions of the insert to position and retain the insert during the sole molding operation.

---

This invention relates to injection mold assemblies generally and is directed more particularly to an injection mold assembly for shoe bottoms having means for positioning and retaining a tread insert in the mold cavity during a mold charging operation.

The injection molding of sole and heel units directly onto lasted shoe uppers is well known in the art. Usually, the bottom of a partially lasted shoe including a lasted upper is brought into engagement with a mold assembly to define collectively with the mold members a sole cavity into which is injected a suitable elastomeric material, such as polyvinylchloride (PVC) in molten form. The mold assembly is permitted to cool during which time the PVC, or like material, solidifies in the shape of the usual sole and heel and becomes adhered to the shoe bottom including the upper. When the mold assembly is opened, the shoe is removed with the sole and heel attached.

The above described procedure has realized substantial economies in shoe manufacture and has been widely utilized. However, there are some objections from the public to all plastic soles. Accordingly, there has developed the practice of incorporating leather or rubber tread pieces in the mold cavity which are molded into the tread surface of the sole. Problems have arisen, however, with regard to properly positioning the tread insert in the mold cavity and in retaining the tread insert in the proper location during a mold charging operation. In addition, unsightly markings left on the sole at the point of injection have detracted from the appearance of the sole. For example, one well known method of incorporating the tread piece in a molded sole comprises having a sprue bushing extending into the mold cavity from the bottom mold member and having a hole in the tread insert through which the bushing is disposed. According to the known procedure, the molten sole material is injected through the hole in the tread insert and into the area between the overlasted upper and the insert. This procedure has the disadvantage of leaving an undesirable showing of PVC in the surface of the tread insert. In addition, inasmuch as the tread insert is held within the mold cavity at one point only, to wit: the sprue bushing, the insert is occasionally moved by the pressure of the flowing plastic.

Accordingly, it is an object of the present invention to provide improved means for incorporating a tread insert in a molded sole unit.

It is a further object of the invention to provide a mold assembly having means for retaining a tread insert at all points along its periphery during a mold charging operation.

A still further object of the invention is to provide an injection mold assembly having means for incorporating a tread insert in a molded sole unit in such a manner as not to leave molding material showing anywhere in the surface of the insert.

With the above and other objects in view, as will hereinafter appear, and in accordance with a feature of the invention, the illustrative mold assembly comprises a bottom mold member and side mold members which, together with the bottom of a partially fabricated shoe define a sole mold cavity. The bottom mold member is characterized by an insert locating rib for receiving a tread insert. In accordance with a further feature of the invention there is incorporated in one of the side mold members a sprue channel through which molten material is introduced between the tread insert and the lasted upper.

The above and other features of the invention, including various novel details of construction and combinations of parts, will now be more particularly described with reference to the accompanying drawings and pointed out in the claims. It will be understood that the particular mold assembly embodying the invention is shown by way of illustration only and not as a limitation of the invention. The principles and features of this invention may be employed in various and numerous embodiments without departing from the scope of the invention.

Reference is made to the accompanying drawings in which there is shown an illustrative embodiment of the invention from which it novel features and advantages will be apparent.

Figure 1:
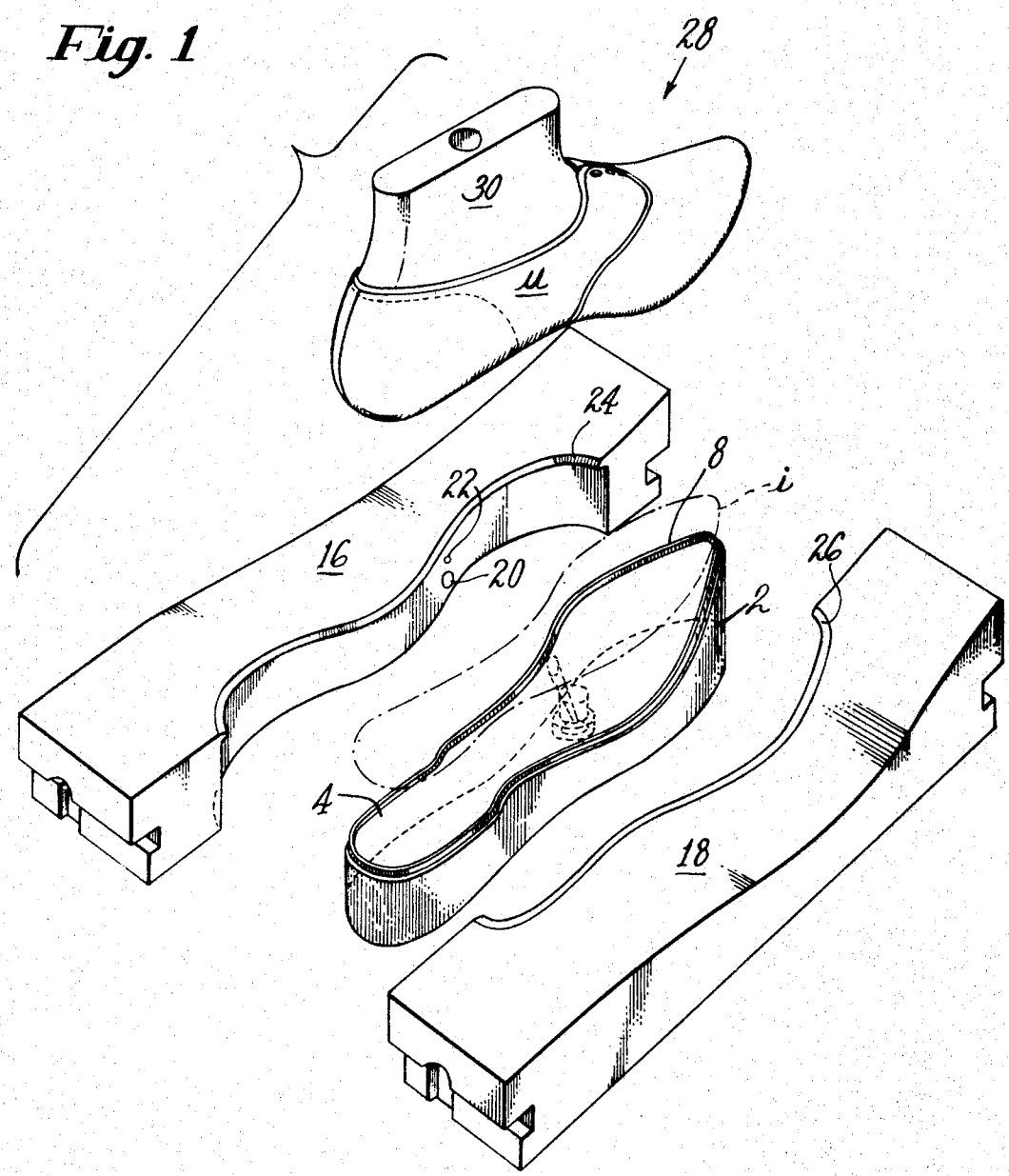
FIG. 1 is an exploded perspective view of one form of mold assembly embodying the invention.
Figure 2:
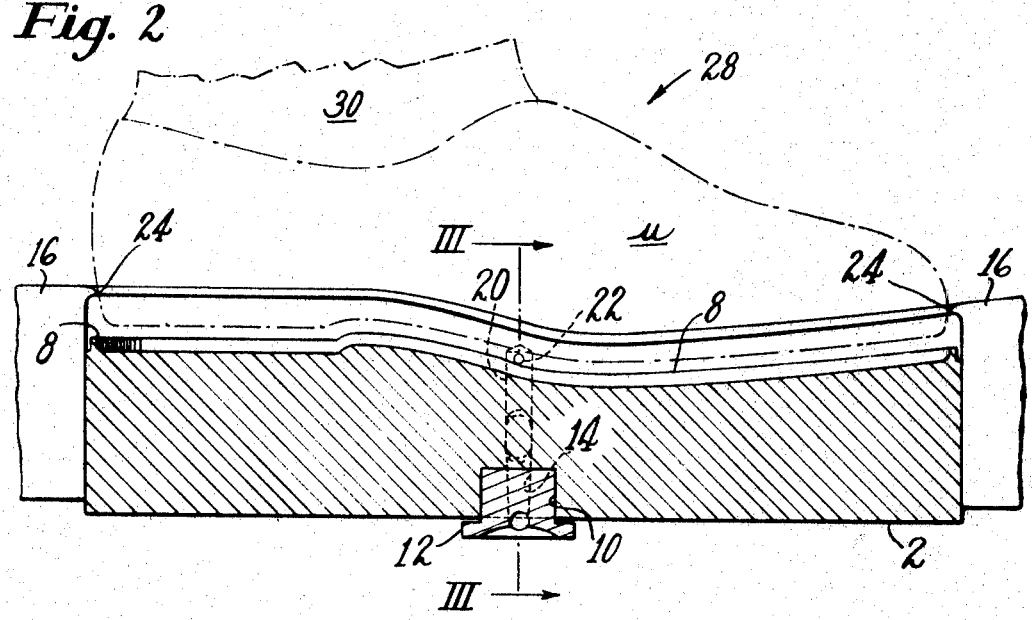
FIG. 2 is a longitudinal sectional view showing a tread insert in place in the mold cavity prior to injection of molten sole material.

Referring to the drawings, it will be seen that the illustrative mold assembly includes a bottom mold member 2 having a surface 4 of a preselected contour to define the tread surface of a shoe. The bottom mold member 2 is also provided with a sprue passage 6 (FIG. 3) for the transfer of molten plastic from a source (not shown) to the mold cavity. In addition, the bottom mold member is provided on its surface 4 with a locating rib 8 which may be integral with the bottom mold member. The locating rib 8 defines an area on the surface 4 of the bottom mold member 2 corresponding to the shape and size of the tread insert to be used. The bottom mold member 2 may be provided with a bore 10 for receiving a sprue bushing 12. The bushing 12 has a sprue passage 14 which is aligned with the sprue passage 6 of the bottom mold member.

A pair of side mold members 16, 18 are provided and are engageable with the bottom mold member 2. One of the side mold members 16 is provided with a sprue passage 20 and a sprue channel 22 which permit communication between the sprue bushing passage 14 and the mold cavity. The side mold members 16, 18 may be provided with bite portions 24, 26, respectively, for engagement with a top mold member 28. The top mold member 28 may comprise a footform 30 supporting a lasted upper $u$ if it is desired to mold the sole unit directly onto an upper.

The illustrative mold assembly is suitable for use in existing injection molding machines, as for example, those described in U.S. Patent No. 3,339,236, issued Sept. 5, 1967, in the names of Leslie C. Battell et al., and U.S. Patent No. 3,358,333, issued December 1967, in the names of Charles J. Kitchener et al. Such machines include means for mounting a bottom mold member, means for moving side mold members into and out of engagement with each other and with the bottom mold member, and means for moving a top mold member into engagement with the side mold members to enclose a mold cavity.

Figure 3:
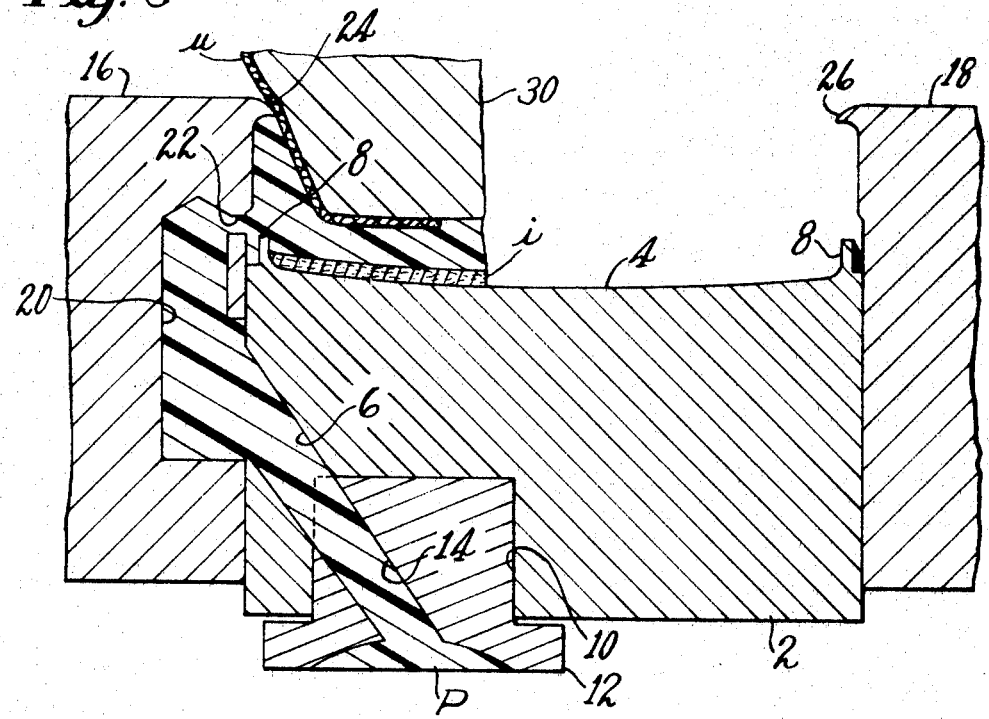
FIG. 3 is a sectional view along lines III—III of FIG. 2.

In operation, the mold members are initially in the "open" position, that is, the side mold members 16, 18 and the top mold member 28 are located outwardly from the stationary bottom mold member 2. Where the top mold member comprises a footform 30 with a lasted upper $u$ mounted thereon, an upper is placed upon the footform in preparation for having a sole molded thereto. A tread insert $i$, of any desired material is placed upon the mold cavity surface 4 of the bottom mold member so that its periphery is engaged by the insert locating rib 8 (FIG. 3). The side mold members are caused by side mold moving means, fully described in the above referred to patent applications, to move toward each other and toward the bottom mold member. In the "closed" position the side mold members are in engagement with the bottom mold member and abut each other.

Figure 5:
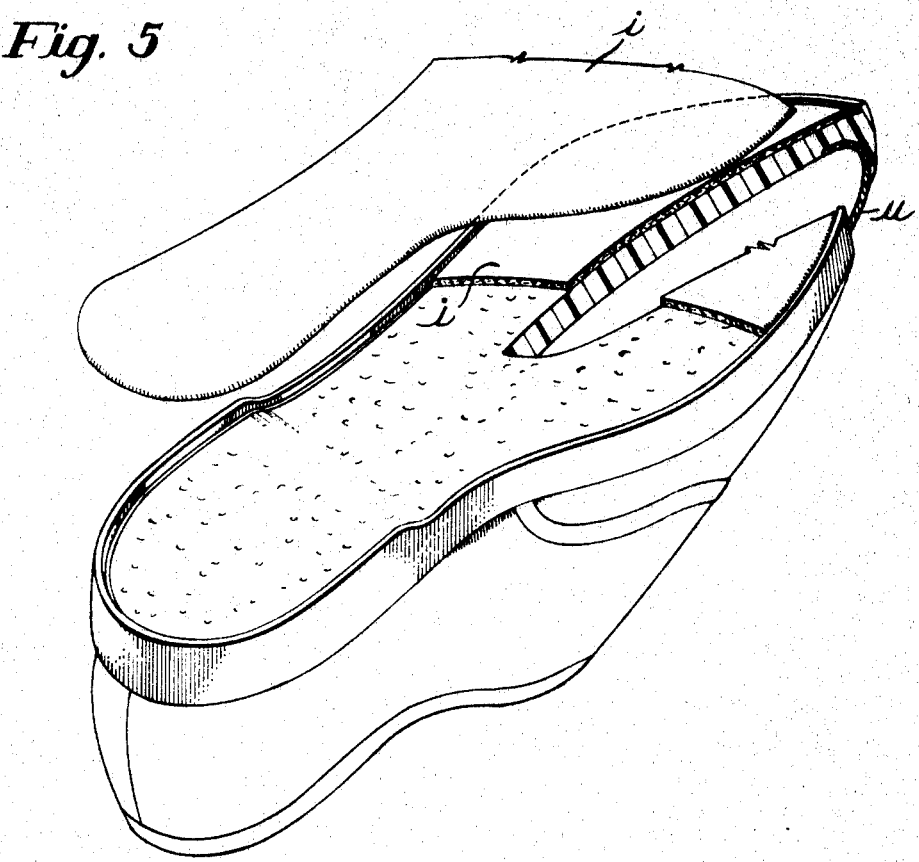
FIG. 5 is a perspective view partially cut away and exploded of a sole molded in the mold assembly of the present invention and having a tread insert disposed therein.

The footform 30, with an upper $u$ fitted thereon, is then moved into position, by means fully described in the above mentioned patents, to engage the side mold members and thereby enclose the mold cavity. Injection means, not shown, but fully described in the above-mentioned patent applications, then causes an elastomeric sole material $p$ (FIG. 3) in molten form, to enter the mold cavity through the sprue passages 14, 6, 20 and the sprue channel 22. The molten elastomeric material $p$ flows between the lasted upper and the bottom mold member, completely covering the tread insert. The molten material also flows around the lower portion of the sides of the upper, or will be seen in FIG. 3, and between the rib 8 and the side mold members 16, 18. When the mold cavity is filled, an automatic shutdown system, not shown, but known in the art, operates to terminate the injection of fluid $p$. After sufficient cooling time has passed, the side mold members are moved outwardly from the bottom mold member, and the footform is moved in a direction away from the bottom mold member. As the footform is moved, it carries with it the upper $u$ with the newly molded-on sole unit, including the insert $i$, attached thereto (FIG. 5).

Figure 4:
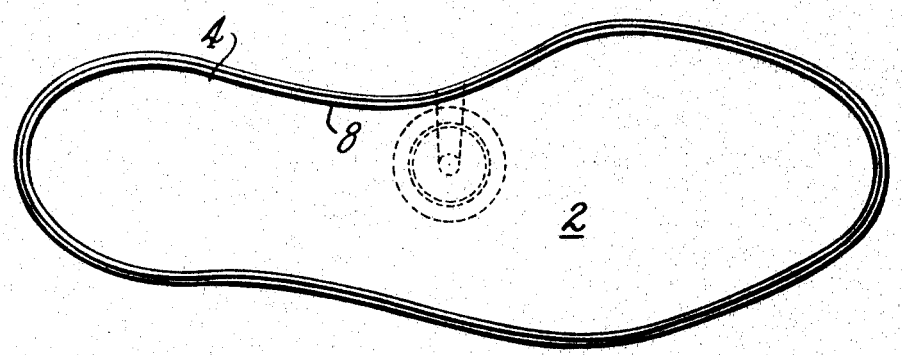
FIG. 4 is a plan view of the bottom mold member.

The soled upper is then taken from the footform (FIG. 4) and another upper placed thereon in preparation for another operating cycle.

Having thus described our invention, what we claim is new and desire to secure by Letters Patent of the United States is:

1. A mold assembly for injection molding of a sole unit having a tread insert, said assembly comprising a bottom mold member, side mold means for forming the edge of the sole unit, a top mold member movable into position for engagement with said side mold means, said top mold member, side mold means, and bottom mold member cooperating to define a mold cavity, and means integral with and extending from the mold cavity surface of said bottom mold member for engaging peripheral portions of the tread insert, said side mold means being provided with passage means for introducing molten injection molding material between the tread insert and the top mold member.

2. The invention according to claim 1 in which said means extending from the mold cavity surface of the bottom mold member comprises insert locating rib means.

3. The invention according to claim 2 in which said rib means comprises an endless insert locating rib for engaging the periphery of a tread insert.

4. The invention according to claim 1 in which said top mold member comprises a footform for mounting a lasted upper thereon.

References Cited

UNITED STATES PATENTS

| 1,877,298 | 9/1932 | Goodwin | 18—30 |
| 2,985,920 | 5/1961 | Borroff et al. | 18—30 |
| 3,305,895 | 2/1967 | Ludwig | 18—30 |

FOREIGN PATENTS

| 638,661 | 4/1962 | Italy. |

WILBUR L. McBAY, *Primary Examiner.*

U.S. Cl. X.R.

18—30; 264—244, 275